June 2, 1970   A. N. DUNCAN   3,515,123
CIRCULATING LIQUID HEATING SYSTEM
Filed April 25, 1968
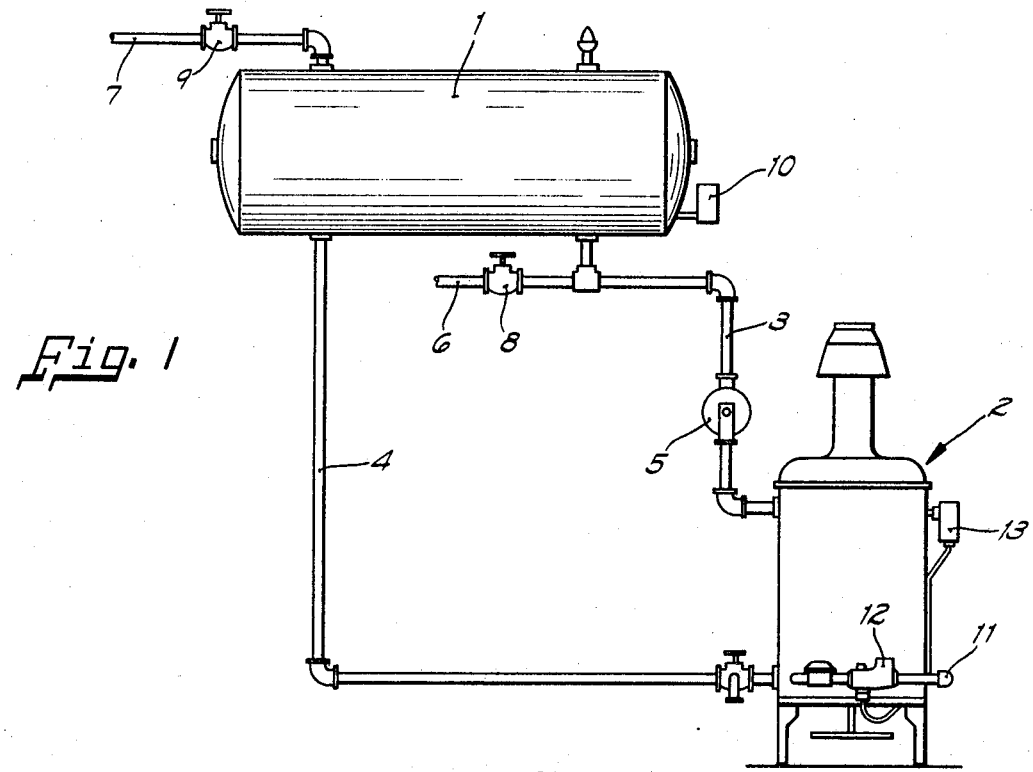
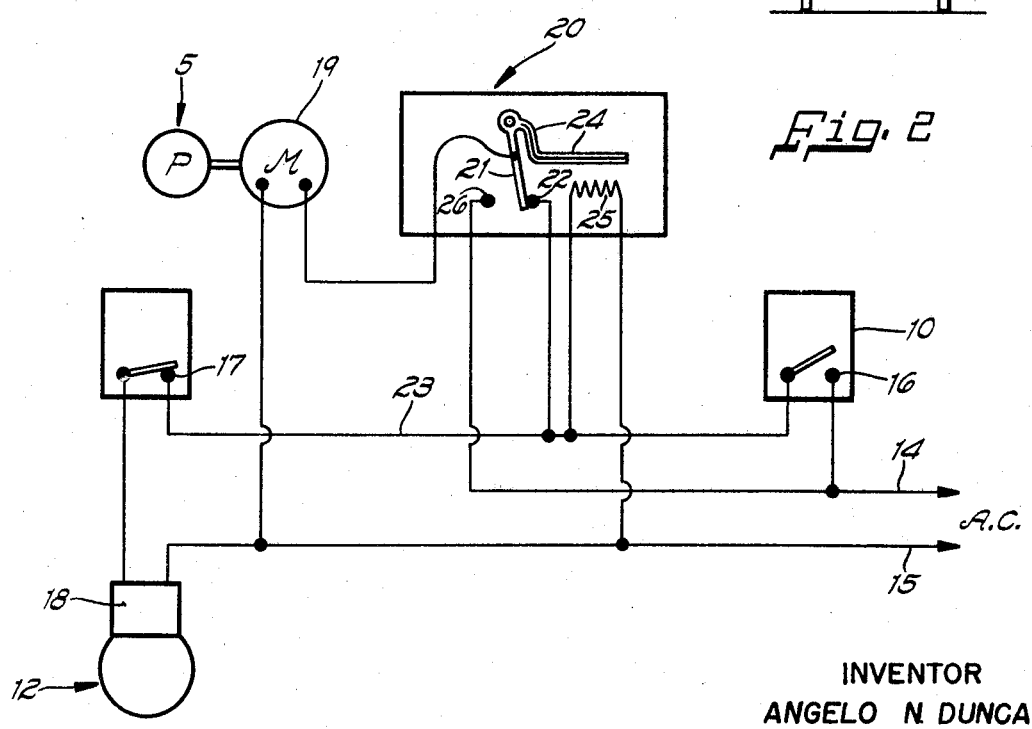
INVENTOR
ANGELO N. DUNCAN
BY Andrus & Starke
Attorneys United States Patent Office 3,515,123
Patented June 2, 1970

3,515,123
CIRCULATING LIQUID HEATING SYSTEM
Angelo N. Duncan, Bourbonnais, Ill., assignor to A. O. Smith Corporation, Milwaukee, Wis., a corporation of New York
Filed Apr. 25, 1968, Ser. No. 724,075
Int. Cl. F24d 3/02
U.S. Cl. 126—362
8 Claims

ABSTRACT OF THE DISCLOSURE

This disclosure relates to a hot water system having an instantaneous water heater connected to a storage tank having a cold water inlet and a hot water outlet.

A heater control is connected to the power line in series with a tank thermostat. A circulating pumping means is connected to the power lines through a thermal relay having a first switch connected to the power lines through the thermostat and an alternate switch connects the pump directly to the power lines. The relay includes a thermal bimetal element connected to the power lines through the thermostat to open the first switch and close the second and operable to maintain the latter for a predetermined period after the reset of the thermostat. The pump operates for a fixed time to cool the heater beyond the point of possible overheating and thermal shock of the system as a result of residual heat in the heater.

---

This invention relates to a circulating liquid heating system and particularly to such a heating system employing an instantaneous type heating unit and a separate receiving means for receiving a continuous flow of liquid from the heating unit while the latter is in operation.

In the provision of a supply of hot water, as well as other heat exchange fluids, a highly satisfactory system employs a separate boiler or water heater which includes a heating coil through which the liquid is pumped by a suitable pumping means to the receiving means in response to a demand signal. The control is such that the pumping means and the heating means are generally simultaneously actuated to provide for immediate circulation of liquid through the heating means to prevent damaging heat concentrations within the heating unit. If the units are simultaneously turned off, the residual heat in the copper and cast iron components of the heater will tend to increase the temperature and actually cause overheating of the parts of the unit, as well as perhaps causing a boiling of the fluid. Systems have been suggested with constant or continuous pump operations to eliminate the problems associated with the termination of the heating cycle. Such systems, while increasing efficiency by transferring of the residual heat to the liquid actually reduce the overall efficiency of the system as a result of the continued circulation after the heating means has cooled and tends to aggravate failure as a result of erosion and corrosion breadown of the liquid passageway system. Temperature control devices have also been suggested; for example, such as shown in U.S. Pat. 2,742,881 which issued Apr. 24, 1956, but have not been commercially employed to applicant's knowledge. The competitive nature of hot water heating systems demand that the control system be minimal.

The present invention is particularly directed to a relatively simple, reliable and inexpensive control providing an instantaneous energization of both a pumping means and the separate heating means in response to a demand signal and a sequential turnoff of the heating means and thereafter the pumping means with a fixed delay time selected to permit the heating means to cool beyond the point of possible overheating and thermal shock as a result of residual heat. Generally, in accordance with the present invention, the separate heating means and the pumping means are provided with individual energizing circuits interconnected through a common switching means to a suitable power input means. In addition, a fixed timing means is interposed or connected between the common switching means and the pumping means and is operable to maintain the pumping means operating for a predetermined time after the sequential actuation of the first common switching means between the first energizing position and a second de-energizing position.

In accordance with a preferred construction of the present invention, the heating means is connected directly to the input means in series with the common switching means. The pumping means is interconnected to the power lines through a thermal relay means having a first switch position interconnecting the pumping means to the input means through the common switching means. The relay means further includes an alternate switch position connecting the pumping means directly to the power input means. The relay means further includes a thermal responsive actuating means such as a relay coil or a heater connected to the power lines through the common switching means. The operating time for the relay means to move from the first to the second position is less than the normal heating cycle such that the second switching position is established during the heating cycle. Furthermore, such second position is maintained for a predetermined period after the deactivation or return of the common switching means to its standby or turn-off position. Such a time delay relay means can be readily provided by the use of a single pole, double throw switch having a common contact connected to the pump means. A normally closed contact is connected to the input power means through the common switching means and a normally open contact is connected directly to the input power means. A relay coil or heater which is coupled to the common contact to selectively position it is connected to the input means through the common switching means.

The scale or sludge forming tendencies of most high temperature fluids is musch less when in motion than when stagnant. The circulation therefore transfers the residual heat into the system to increase the efficiency, and increase the length of time between scale removal maintenance.

The present invention thus provides a simple, reliable and inexpensive control to protect against the overheating of the water and the establishment of thermal shock within the system while increasing the efficiency of the system.

The drawing furnished herewith illustrates a preferred construction of the present invention in which the above advantages and features are clearly disclosed, as well as others which will be readily understood from the following description.

In the drawing:
FIG. 1 is a diagrammatic illustration of a hot water heating system employing the present invention; and
FIG. 2 is a schematic circuit diagram illustrating the application of the present invention.

Referring to the drawing and particularly to FIG. 1, the embodiment of the invention is described in connection with a hot water heating system employing a hot water storage tank 1 interconnected to a gas fired heating unit 2 having a bottom or underfired gas burner, not shown. Circulating lines 3 and 4 interconnect the storage tank 1 to the heating unit 2. A pump 5 is provided in the one circulating line 3 for positively transferring water from the heating unit 2 to the tank 1.

Cold water is supplied to the storage tank 1 through a conduit 6 and hot water at a selected temperature is drawn from the hot water tank 1 through a conduit 7.

The conduits 6 and 7 may be closed or opened as desired by means of valves 8 and 9, respectively.

A thermostat unit 10 is provided in the lower portion of the tank 1 to sense the temperature of the stored water and control the heating unit 2 and the pump 5. The hot water heater 2 is of a conventional type in which the water is passed through a coiled conduit and heated by a gas burner, not shown. Gas is supplied to the burner through a gas line 11 and the flow of gas within line 11 is controlled by a solenoid operated gas valve 12. A water temperature control thermostat 13 is disposed in the coiled conduit and is responsive to the water temperature therein. The thermostat 13 serves to modulate the flow of gas to the burner in response to the demand for heat established by unit 10.

When the thermostat unit 10 establishes a demand signal, the gas valve 12 is opened to fire the burner and the pump 5 is simultaneously actuated to circulate hot water from the heating unit 2 to the tank 1.

Referring particularly to FIG. 2, a schematic circuit diagram illustrates the connections of a set of power lines 14 and 15 to actuate the pump 5 and the gas valve 12. The thermostat units 10 and 13 are shown schematically including control switches 16 and 17, respectively, which are connected in series with each other and with the solenoid 18 of gas valve 12 to the incoming power lines 14 and 15. Switch 16 is normally open to restrict actuation of the heating unit 2 to demand for hot water. Switch 17 is normally closed and opens only if the water temperature rises above a selected unit. The pump 5 includes a drive motor 19 which is interconnected to the incoming power lines 14 and 15 through a pair of energizing circuit paths by a delay switching means 20 in accordance with the teaching of the present invention.

In particular, the illustrated switching means 20 is a single pole, double throw relay unit having a common contact arm 21 connected to the one side of the pump motor 19, the opposite side of which is connected directly to the power line 15. A normally closed contact 22 engaging contact 21 is connected to the circuit line 23 between the thermostat switch 16 and the limit switch 17. A bimetal element 24 is coupled to contact 22 and a heater 25 is connected between the line 23 and the power line 15. The heater 25 is simultaneously energized with the solenoid 18 of gas valve 12 and the motor 19 of the pump 5 as long as contact 21 engages contact 22 and switch 16 is closed. After a selected time period, the bimetal heater 25 deflects the bimetal element 24 and moves the contact arm 21 from the normally closed contacts 22 to a normally open contact 26 which is interconnected directly to the incoming power line 14 and thus provide a circuit directly to the motor 19 of the pump 5 which is independent of the thermostat switch 16.

In the normal standby position, the common contact arm 21 is in engagement with the normally closed contact 22. When the thermostat switch 16 of thermostat unit 10 closes as a result of a demand for hot water, power is simultaneously applied directly to the gas solenoid valve 12 and to the pump 5 through the normally closed contact 22 and the common contact arm 21. As a result, the burner will be ignited to heat the water which is circulated by the pump 5 to the storage tank 1. During the heating cycle, the bimetal heater 25 also carries current and heats the element 24. After a selected time less than the normal heating cycle, the bimetal element 24 will move the contact arm 21 from the normally closed contact 22 to the normally open contact 26 to establish the independent circuit for the motor 19 at pump 5.

When the thermostat switch 16 of unit 10 now opens indicating that the demand for further hot water has been terminated, the circuit to the solenoid 18 of valve 12 and to the bimetal heater 25 is opened. The bimetal element 24 will begin to cool. Until it reaches a predetermined decreased temperature condition, however, it holds the common contact arm 21 in engagement with the normally open contact 26, thereby maintaining power directly on the motor 19 from the pump 5 to continue the circulation of water through the heating unit 2 and to the tank 1. After a fixed time period, the bimetal element 24 cools to the point where the contact arm 21 returns with a snap action to the normally closed contact 22. At this time, however, the thermostat switch unit 10 is open and consequently the pump 5 is held deenergized until a subsequent demand.

Therefore, the solenoid gas valve 12 and the pump 5 are instantaneously and simultaneously energized in response to a demand signal. However, when the heating unit 2 shuts off, the pump 5 continues to circulate the water to balance the temperature in the heating unit 2 and the tank 1 to avoid overheating of the high temperature water as a result of the residual heat in the components of the heating unit 2. This will increase the general overall efficiency of the system and further minimize the tendency to form scale within the circulating system because the motion of the high temperature water reduces the scale forming characteristics.

The illustrated embodiment of the invention shows the delayed control applied to a single heater and pump. In actual practice, various applications employ single or multiple heating units with one or more pump units. The present invention would merely require the application of a balance switching means for each pump to maintain proper controlled operation of the multiple pump heating unit system.

The present invention thus provides an improved means for avoiding the over-temperature conditions associated with the termination of the heating cycle in an instantaneous type water heating unit.

Various modes of carrying out the invention are contemplated as being within the scope of the following claims particularly pointing out and distinctly claiming the subject matter which is regarded as the invention.

I claim:

1. In a heating system having a heated medium receiving means interconnected to a separate heating means and having circulating means to circulate the medium through the heating means, comprising a demand control system for operably turning on said heating means and said circulating means in response to a demand signal and having a preset fixed timing means operable independently of the temperature of the medium to maintain said circulating means in operation a selected preset period after said heating means is turned off.

2. The heating system of claim 1 having the heated medium receiving means and the separate heating means interconnected in a closed loop and said control circuit includes a common means to simultaneously activate both said heating means and said circulating means and a timing means interposed between said common means and said circulating means and operably to sequentially deactivate said heating means and said circulating means with a pre-selected fixed time delay.

3. In a liquid heating system having a heated liquid receiving means and a separate heating means and having pumping means to circulate liquid therethrough, comprising a control circuit for said heating means and said pumping means including
 a first energizing circuit means for said heating means,
 a second energizing circuit means for said pumping means,
 an input power means,
 a first common switching means connecting both said energizing circuit means to said input means to simultaneously actuate both said heating means and said pumping means, and
 a delay switching means having a standby position contact means connected in the second energizing circuit means and maintaining a circuit between said common switching means and pumping means to said input means and having an actuated position contact means establishing an independent circuit connection of said pumping means to said input means, and a third energizing circuit means connecting said delay switching means to said input means through said common switching means to selectively actuating said contact means.

4. The heating system of claim 3 wherein said first common switching means is a thermally actuated switch means mounted to sense the temperature of the liquid in said receiving means.

5. The heating system of claim 3 wherein said delay switching means having a standby position contact means which are normally closed and said actuated position contact means are normally open and actuating means connected in said third energizing circuit means.

6. The liquid heating system of claim 3 wherein said switching means includes a common contact for engaging a first normally closed contact to define said standby position contact means and a second normally open contact to define said actuated position contact means, and said common contact is connected to said pumping means, and an actuating means is coupled to a common contact and connected in said third energizing circuit means, said actuating means providing a timed delay movement of said common contact from said normally closed contact to said normally open contact in response to actuation of said common switching means to actuate said heating means and a timed delay movement of said common contact from said normally open contact to said normally closed contact in response to actuation of said common switching means to deactivate said heating means.

7. A hot water heating system having a storage tank and a separate heating unit connected in a closed loop and having pumping means to circulate liquid therethrough, said storage tank having a cold water inlet and a hot water outlet and a thermostatic switch unit adjacent the cold water inlet, comprising a control circuit for said heating unit and said pumping means including, a first energizing circuit means for said heating means, a second energizing circuit means for said pumping means, an input power means, said thermostatic switch unit connected between both of said energizing circuit means and said input power means to simultaneously actuate both said heating unit and said pumping means, and a delay switching means having first contacts connected in the second energizing circuit means and having second contacts connecting said pumping means directly to said input power means, and a fixed timing means for selectively actuating said delay switching means and to alternately close and open said first and second contactcs and connected to said input power means in series with said thermostatic switch unit.

8. The heating system of claim 7 wherein said fixed timing means includes a thermal response means coupled to said first and second contacts and having heating means connected to said input power means in series with said thermostatic switch unit.

References Cited
UNITED STATES PATENTS

| | | | |
|---|---|---|---|
| 2,704,571 | 3/1955 | Reichelderfer | 126—110 X |
| 2,739,794 | 3/1956 | Graham. | |
| 2,742,881 | 4/1956 | Rideout et al. | 122—448 |
| 2,841,337 | 7/1958 | Haugen | 237—8 |

CHARLES J. MYHRE, Primary Examiner